United States Patent
Philipsen et al.

(10) Patent No.: US 6,461,657 B1
(45) Date of Patent: Oct. 8, 2002

(54) SYNERESIS SUPPRESSION IN PREPARED MUSTARDS

(76) Inventors: Douglas H. Philipsen, 38 Vassar Rd., Great Meadows, NJ (US) 07838; Weizhu Yu, 56 Whitewood Dr., Morris Plains, NJ (US) 07950; Koo H. Chung, 2704 Cortland La., Whipanny, NJ (US) 07981; William Richard Drummond, 33 Pheasant Walk, Sparta, NJ (US) 07871

( * ) Notice: Subject to any disclaimer, the term of this patent is extended or adjusted under 35 U.S.C. 154(b) by 0 days.

(21) Appl. No.: 09/619,036

(22) Filed: Jul. 19, 2000

(51) Int. Cl.[7] .................. A23L 1/0524; A23L 1/225
(52) U.S. Cl. .................. 426/324; 426/392; 426/638; 426/629; 426/573; 426/577
(58) Field of Search ............... 426/324, 330, 426/573, 577, 629, 508, 392, 638, 615, 507, 331

(56) References Cited

U.S. PATENT DOCUMENTS

| | | | |
|---|---|---|---|
| 4,129,663 | * 12/1978 | Jamison et al. | 426/602 |
| 4,525,372 | * 6/1985 | Giddey et al. | 426/564 |
| 5,102,681 | * 4/1992 | Singer et al. | 426/589 |
| 5,324,531 | * 6/1994 | Hoefler et al. | 426/573 |
| 5,338,561 | * 8/1994 | Campbell et al. | 426/602 |
| 5,529,796 | * 6/1996 | Gobbo et al. | 426/330.3 |
| 6,143,346 | * 11/2000 | Glahn | 426/577 |

FOREIGN PATENT DOCUMENTS

RU 2003264 C1 * 11/1993

* cited by examiner

Primary Examiner—Milton I. Cano
Assistant Examiner—Robert R. Madsen

(57) ABSTRACT

A process is provided for making a prepared mustard product having reduced tendency for syneresis. A slurry is prepared to contain ground mustard seed, water, vinegar, salt and an amount of type JMJ pectin effective to reduce the tendency toward syneresis, e.g., from about 0.1 to 0.5% by weight. The resulting slurry is then homogenized sufficiently to provide a viscosity of from 7,000 to 25,000 centipoises after setting. Upon packaging, the product will have less tendency to suffer separation of water to form a free phase.

8 Claims, 1 Drawing Sheet

SYNERESIS SUPPRESSION IN PREPARED MUSTARDS

BACKGROUND OF THE INVENTION

The invention relates to prepared mustard products having improved shelf life in terms of resistance to syneresis and to a process for preparing them.

Prepared mustards tend to separate after preparation and storage. Typically, a clear liquid phase will separate from the main body of the mustard, which is essentially a slurry of ground mustard seed in vinegar and other acidulents, with some salt, flavorings and seasonings. This separation is referred to as syneresis and has been long recognized by producers and consumers alike. Unfortunately, neither the exact cause nor a suitable solution to the problem has been identified.

In U.S. Pat. No. 4,525,372, Giddey, et al., address the problem of syneresis in prepared mustards by changing the texture and, in effect, creating a new type of product. They provide a seasoning or light condiment having a mustard base, that is characterized by a dispersed phase of an inert gas or air giving it a mousse structure and a density less than or equal to 0.9 g/cc. In order to facilitate the formation of the mousse, they preferably utilize a foaming or swelling agent. Among these are powdered egg whites, or the extracts of polypeptides such as the hydrolysates of caseine, gluten, soy or other substances capable of forming a mousse by heating in the presence of a gas. The quantity of foaming agent is described as being between 0.5 and 2% by weight of the condiment before the foam-forming. In addition, they employ stabilizing agents such as gelatin, pectine, propylene glycol alginate and others in an amount of between 1 and 3.5 weight percent of the total mixture before swelling. The preferred products are further modified by reducing the moisture content as compared to conventional prepared mustards.

Our own research tested various gums and gelling agents, but the typical effect of such modifications of the product formulation caused changes in the viscosity or mouthfeel of the mustard. Gelation as a means for preventing water separation has been found to be an unsatisfactory solution.

There is a need for a process for stabilizing prepared mustards to prevent unsightly and unappetizing water separation.

DISCLOSURE OF INVENTION

Accordingly, it is an object of the invention to provide a process for stabilizing mustard such that it becomes resistant to syneresis and is less affected by storage times and conditions.

It is an object of the invention to provide a prepared mustard product and a process for preparing it, the product having reduced syneresis but essentially the same eating properties as the unimproved product.

It is a more specific object of the invention to provide a prepared mustard product and a process for preparing it, the product having reduced syneresis but essentially the same viscosity as the unimproved product.

It is another specific object of the invention to provide a prepared mustard product and a process for preparing it, the product having reduced syneresis but essentially the same mouth feel as the unimproved product.

It is another specific object of the invention to provide a prepared mustard product and a process for preparing it, the product having reduced syneresis but essentially the same flavor as the unimproved product.

These and other objects are realized by the present invention, which provides both a process for preparing mustard with improved shelf life and the mustard products having the improved properties.

In one aspect of the invention, a process is provided for making a prepared mustard product having reduced tendency for syneresis, the process comprising: preparing a slurry of ground mustard seed, water, vinegar, salt and an amount of type JMJ pectin effective to reduce the tendency toward syneresis, e.g., from about 0.1 to 0.5% by weight; milling the slurry, preferably sufficiently to provide a viscosity of from 7,000 to 25,000 centipoises (Brookfield viscometer, spindle #5, 20 rpm, 20° C.) after setting; feeding the slurry into sealable packaging containers; and sealing the packaging containers.

In another aspect, the invention provides a prepared mustard product in the form of a homogenized slurry comprising ground mustard seed, water, vinegar, salt and from about 0.1 to 0.5% pectin, type JMJ.

Other preferred aspects of the invention will be detailed below.

BRIEF DESCRIPTION OF THE DRAWINGS

The invention will be better understood and its advantages will become more apparent from the following detailed description, especially when read in light of the accompanying drawings, wherein.

DETAILED DESCRIPTION OF THE INVENTION

Figure 1:
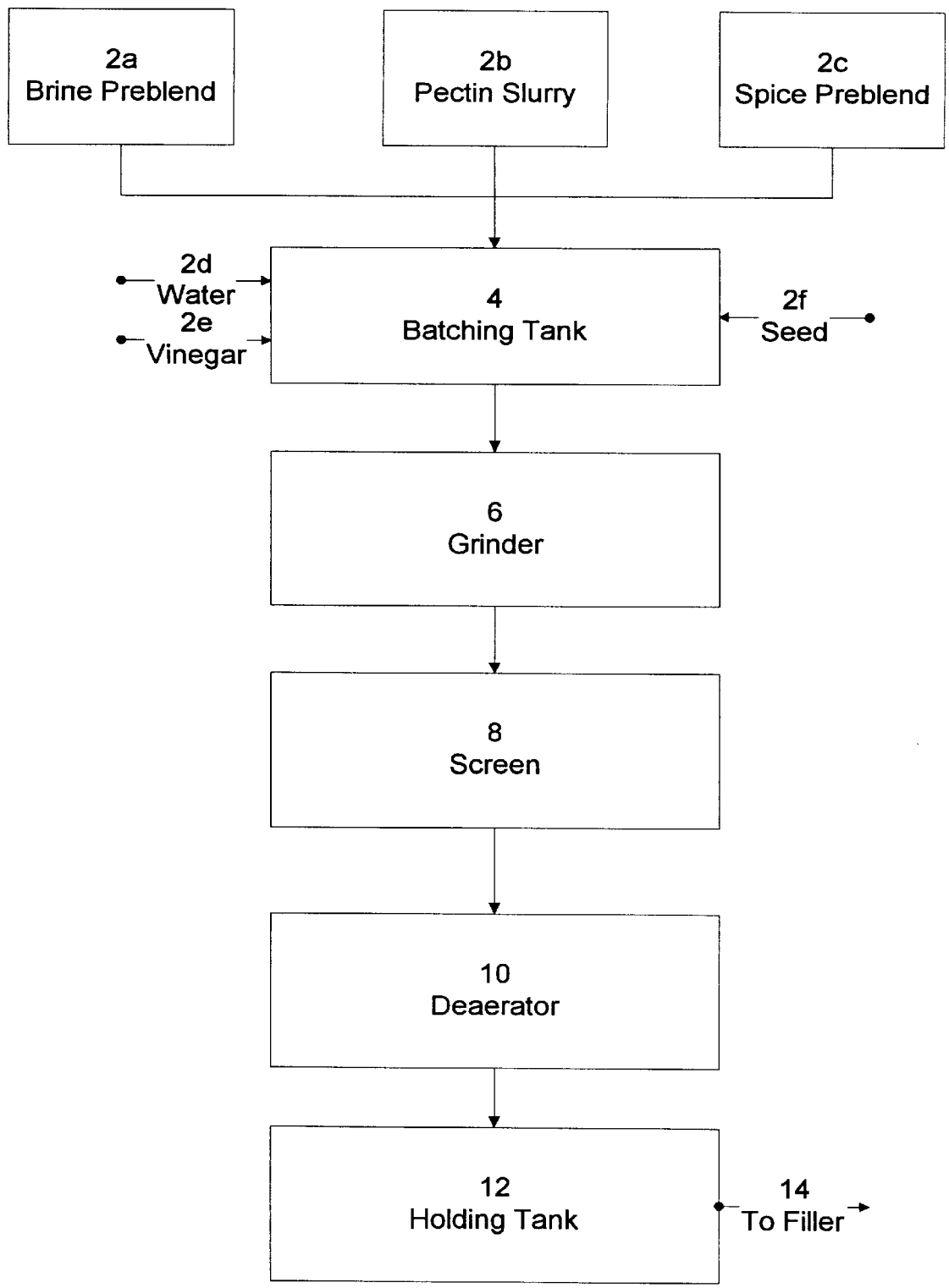
FIG. 1 is a flow diagram of a typical process for mustard preparation.

The invention will be described below with specific reference to preferred mustard products of the Dijon type, in the form of a water-based slurry of suitably acidified and seasoned ground mustard seeds, such as from Brassica juncea (brown or yellow-coated) or Brassica nigra mustard seed. The invention, however, has applicability to any prepared mustard.

Typically, yellow mustards are prepared by mixing the ingredients which include water, vinegar, yellow mustard seed, salt, spices, and turmeric and then fully grinding these ingredients. In this process, the entire yellow mustard seed remains in the resulting mustard paste. Pungent mustards utilize brown mustard seeds generically which are known to include: brown (i.e., Brassica juncea), oriental (i.e., yellow-coated Brassica juncea), and black (i.e., Brassica nigra) mustard seeds. Such mustards are known and valued for their nose-clearing, volatile "hotness" or pungency. Such mustards contain various levels of the volatile oil of mustard known as allyl isothiocyanate.

Prepared mustard products are produced by the process disclosed in the schematic flow diagram of FIG. 1. Generally, conventional mustard ingredients are added to batch tank 4 by direct feed via feeds 2a–f of principal ingredients and several preblend vessels 2a, 2b and 2c, for blending. The ingredients include, but are not limited to, water (line 2d), vinegar (line 2e), food acids (e.g., citric, malic, fumaric, tartaric, etc.) salt, spices (e.g., alspice, nutmeg, etc.), herbs, flavorants, vegetables, fruits, sweeteners (e.g., corn syrup, sugar or honey), juices, extracts, starches, flours, thickeners, and whole or crushed mustard seeds (usually a blend of brown and yellow via line 2f) or fractions thereof In one full-scale version of the process, the spice blend and the pectin are combined into one preblend and mixed with heated water (@ 140–200° F.) utilizing a Breddo Likwifier high shear mixer until complete solution of the pectin is achieved.

Once blended, the ingredients are conveyed to grinder 6 where the solid ingredients are reduced in size. The effluent of grinder 6, such as an Urschel Comitrol utilizing a 140 or 180 blade head depending on the desired fineness of particles, is then passed through screen 8, such as a Demoisy separator, to remove spent brown mustard seed bran. The material not retained by screen 8 is passed to a conventional deaerator 10 to remove air, to achieve density and viscosity targets. For example, for a Dijon type mustard, the density range will be from about 8 to 10 pounds per gallon and have a viscosity as produced of from 7,000 to 20,000 centipoises. Next, the deaerated mustard paste is typically passed to holding tank 12 where the mustard paste may be retained for feed to the packaging lined These steps accomplish milling the slurry sufficiently to provide a viscosity of from 7,000 to 25,000 centipoises (Brookfield viscometer, spindle #5, 20 rpm, 20° C.) after setting. A more preferred viscosity range will be from about 8,000 to about 20,000 centipoises. The prepared mustard paste will be filled into suitable sealable containers after passage to filler station via line 14. The filled containers are then sealed in typical fashion.

When prepared in the usual manner, as it has been for many years, water often separates as a separate phase in an unpredictable and unexplained manner. The invention enables the suppression of this phenomenon by the incorporation of an amount of pectin, GENU type JMJ, effective for this purpose preferably from about 0.1 to 0.5%, available from Hercules. It will be understood that commercial. equivalents are included within this type definition. This type of pectin is a high ester pectin extracted aqueously from citrus peel (or apples) and standardized by addition of sucrose. Compositionally, it is a hydrocolloid consisting mainly of the partial methyl esters of polygalacturonic acid. The product has a stabilizing power of 130+10 SAM, a pH in 1% solution in deionized water of 3.6 to 4.4, a degree of esterification of 68 to 73% and a loss on drying of <12%. A method for determining SAM grade is detailed in a test procedure provided by the manufacturer, captioned SAM Determination provided herewith and incorporated herein by reference. It is noted that tests conducted with low-methoxyl pectins, high-methoxyl pectins, xanthan gum, egg white and polypro gelatin were not effective.

The following examples are provided to further illustrate and explain a preferred form of the invention and are not to be taken as limiting in any regard. Unless otherwise indicated, all parts and percentages are by weight. The compositions below illustrate exemplary ranges of ingredients.

EXAMPLE 1

Two batches of mustard products were prepared from the following ingredients, with the difference being that the pectin was employed in one batch and not in the other.

| Ingredient | Parts by Weight |
| --- | --- |
| Water | 57 |
| Yellow and Brown Mustard Seed | 23 |
| White Distilled Vinegar @ 120 grain | 14 |
| Sodium Chloride | 6 |
| White Wine, 13% alcohol by volume | 0.3 |
| Pectin, typeJMJ, In test batch only | 0.1, 0.15, 0.20, 0.25 |
| Spices and Food Acids | 0.2 |

As preliminary operations, a brine was prepared from the salt and 16.9 parts of the water. Also a pectin slurry was prepared from the pectin and 4.9 parts of water. And, a spice blend was prepared with the spices and food acids.

The prepared mustard was filled into 16 ounce jars. The packaged mustard was allowed to set by storing it at ambient conditions for 10 days. Then, the jars were placed on their sides, a condition known to induce separation. The table below summarizes the test results of the control formulation containing no pectin and for each of the test formulations. Each cell shows the number of jars wherein the product was separated for each time period.

| Formulation | 1 Day | 2 Days | 3 Days | 7 Days |
| --- | --- | --- | --- | --- |
| Control | 6/10 | 7/10 | 8/10 | 10/10 |
| 0.10% Pectin | 1/10 | 2/10 | 3/10 | 6/10 |
| 0.15% Pectin | 5/10 | 5/10 | 6/10 | 7/10 |
| 0.20% Pectin | 3/10 | 4/10 | 5/10 | 6/10 |
| 0.25% Pectin | 1/10 | 1/10 | 2/10 | 6/10 |

EXAMPLE 2

This example repeats the preparation procedure of Example 1 for a different prepared mustard formulation.

| Ingredient | Parts by Weight |
| --- | --- |
| Water | 54 |
| Brown and Yellow Mustard Seed | 26 |
| White Distilled Vinegar @ 120 grain | 14 |
| Sodium Chloride | 6 |
| White Wine, 13% alcohol by volume | 0.3 |
| Pectin, type JMJ | 0.1 |
| Spices and Food Acids | 0.2 |

The product will show improved resistance to syneresis as compared to a control product not containing the pectin.

EXAMPLE 3

This example repeats the preparation procedure of Example 2 for a different prepared mustard formulation.

| Ingredient | Parts by Weight |
| --- | --- |
| Water | 59 |
| White Distilled Vinegar @ 120 grain | 20 |
| Brown and Yellow | 18 |

| Ingredient | Parts by Weight |
| --- | --- |
| Mustard Seed | |
| Sodium Chloride | 2.5 |
| White Wine, 13% alcohol by volume | 0.3 |
| Pectin, type JMJ | 0.1 |
| Herbs, Spices and Food Acids | 0.2 |
| Dispersant | 0.01 |

The product will show improved resistance to syneresis as compared to a control product not containing the pectin.

EXAMPLE 4

This example repeats the preparation procedure of Example 2 for a different prepared mustard formulation.

| Ingredient | Parts by Weight |
| --- | --- |
| Water | 25 |
| Apple Cider Vinegar @ 50 grain | 19 |
| High Fructose Corn Syrup | 15 |
| Brown and Yellow Mustard Seed | 20 |
| Corn Syrup | 7 |
| White Distilled Vinegar @ 120 grain | 6 |
| Brown Sugar | 4 |
| Honey | 4 |
| Pectin, type JMJ | 0.1 |
| Spices and Food Acids | 0.2 |

The product will show improved resistance to syneresis as compared to a control product not containing the pectin.

EXAMPLE 5

This example repeats the preparation procedure of Example 2 for a different prepared mustard formulation.

| Ingredient | Parts by Weight |
| --- | --- |
| Water | 59 |
| White Distilled Vinegar @ 120 grain | 16 |
| Yellow and Brown Mustard Seed | 20 |
| Sodium Chloride | 3 |
| Grated Horseradish | 2 |
| White Wine | 0.5 |
| Pectin, type JMJ, | 0.1 |
| Spices and Food Acids | 0.3 |

The product will show improved resistance to syneresis as compared to a control product not containing the pectin.

The above description is intended to enable the person skilled in the art to practice the invention. It is not intended to detail all of the possible modifications and variations, which will become apparent to the skilled worker upon reading the description. It is intended, however, that all such modifications and variations be included within the scope of the invention which is defined by the following claims. The claims are meant to cover the indicated elements and steps in any arrangement or sequence which is effective to meet the objectives intended for the invention, unless the context specifically indicates the contrary.

What is claimed is:

1. A process for preparing a prepared mustard paste product having reduced tendency for syneresis, the process comprising:

preparing a slurry of ground mustard seed, water, vinegar, salt and a high ester pectin having a stabilizing power of 130±10 grade SAM, a pH in 1% solution in deionized water of 3.6 to 4.4, a degree of esterification of 68 to 73% and a loss on drying of <12%, said pectin being present in an amount effective to reduce the tendency for syneresis; and milling the slurry; feeding the slurry into sealable packaging containers; and sealing the packaging containers.

2. A process according to claim 1 wherein the mustard paste exhibits a viscosity of from 7,000 to 25,000 centipoises after setting.

3. A process according to claim 1 wherein the pectin is employed at a level of from about 0.1 to 0.5% by weight.

4. A process for preparing a prepared mustard paste product having reduced tendency for syneresis, the process comprising:

preparing a slurry of ground mustard seed, water, vinegar, salt and an amount of from 0.1 to 0.5% by weight of a high ester pectin having a stabilizing power of 130±10 grade SAM, a pH in 1% solution in deionized water of 3.6 to 4.4, a degree of esterification of 68 to 73% and a loss on drying of <12%, said pectin being effective to reduce the tendency for syneresis; and milling the slurry; feeding the slurry into sealable packaging containers; and sealing the package containers;

wherein the mustard paste exhibits a viscosity of from 7,000 to 25,000 centipoises after setting.

5. A prepared mustard paste product comprising ground mustard seed, water, vinegar, salt and an amount of a high ester pectin having a stabilizing power of 130±10 grade SAM, a pH in 1% solution in deionized water of 3.6 to 4.4, a degree of esterification of 68 to 73% and a loss on drying <12%, said pectin being present in an amount effective to reduce the tendency for syneresis.

6. A product according to claim 5 wherein the mustard paste exhibits a viscosity of from 7,000 to 25,000 centipoises after setting.

7. A product according to claim 5 wherein the pectin is employed at a level of from about 0.1 to 0.5% by weight.

8. A prepared mustard paste product having a viscosity of from 7,000 to 25,000 centipoises comprising ground mustard seed, water, vinegar, salt and an amount from about 0.1 to 0.5% by weight of a high ester pectin having a stabilizing power of 130±10 grade SAM, a pH in 1% solution in deionized water of 3.6 to 4.4, a degree of esterification of 68 to 73% and a loss on drying of <12%, said pectin being effective to reduce the tendency for syneresis.

* * * * *